B. WATANABE.
COKE RAKE.
APPLICATION FILED FEB. 14, 1918.
1,291,305.
Patented Jan. 14, 1919.
2 SHEETS—SHEET 1.
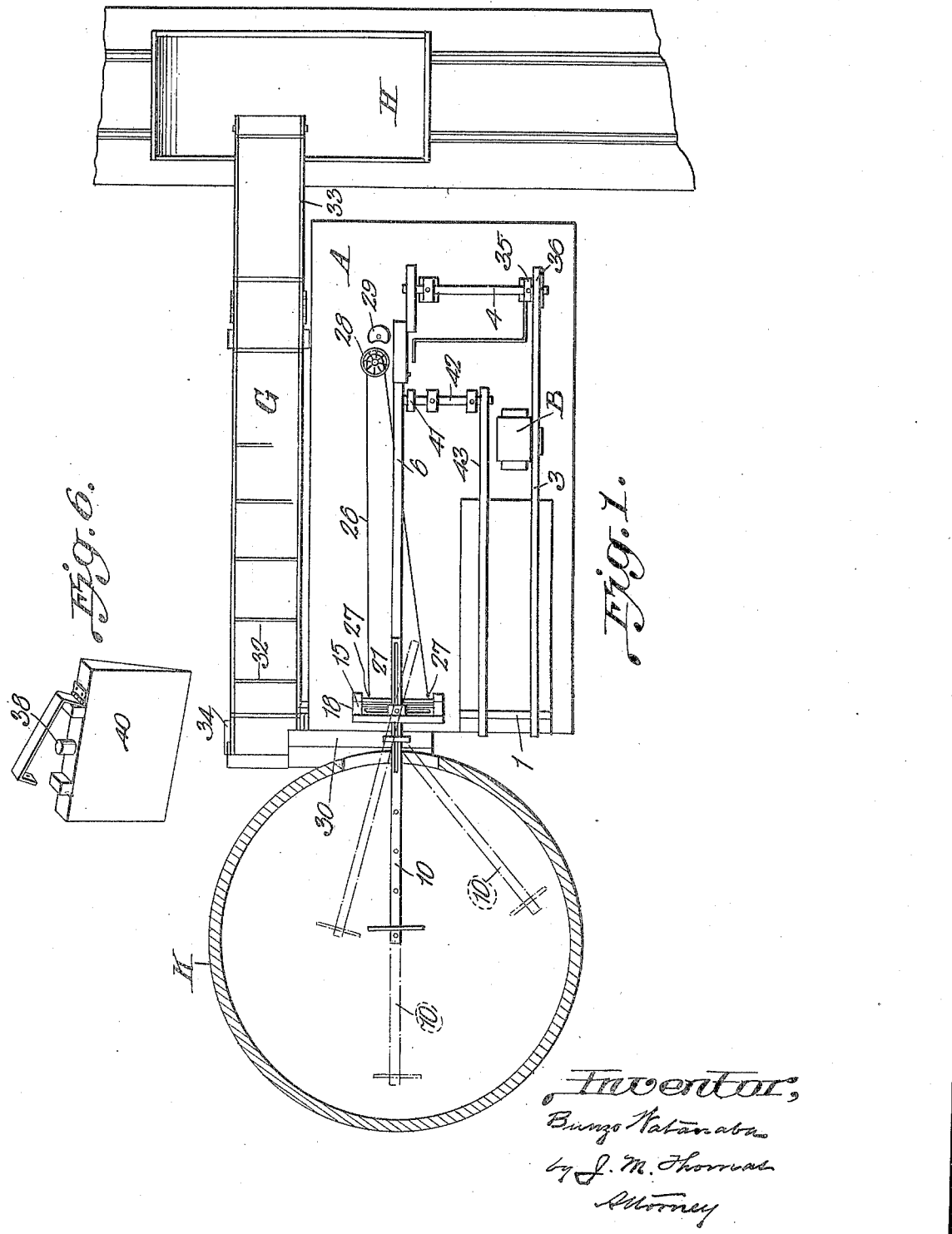

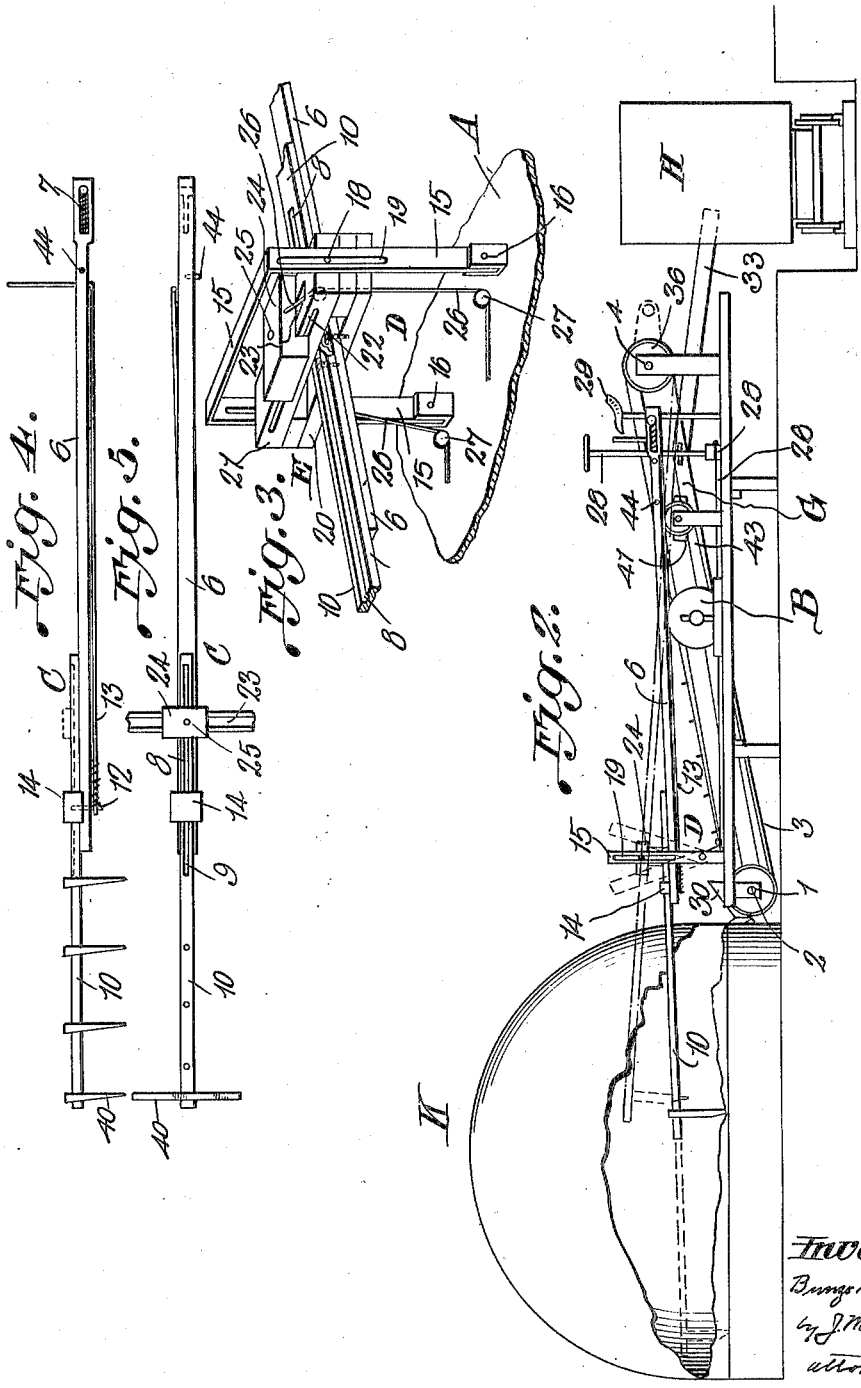

UNITED STATES PATENT OFFICE.

BUNZO WATANABE, OF SALT LAKE CITY, UTAH.

COKE-RAKE.

1,291,305.  Specification of Letters Patent.  Patented Jan. 14, 1919.

Application filed February 14, 1918. Serial No. 217,250.

*To all whom it may concern:*

Be it known that I, BUNZO WATANABE, a citizen of Japan, residing at Salt Lake City, in the county of Salt Lake and State of Utah, have invented certain new and useful Improvements in Coke-Rakes, of which the following is a specification.

My invention relates to means for handling coke, and has for its object to provide a mechanically operated means for withdrawing coke from the oven in which it is burned and loading it into a car or other conveyance, whereby the coke may be easily and quickly drawn from any one of a string of ovens before the coke or oven is cold, and elevated into a car and more economically than heretofore.

These objects are accomplished with the apparatus illustrated in the accompanying drawings in which similar letters and numerals of reference indicate like parts throughout the several figures, and as described in the specification forming a part of this application and pointed out in the appended plans.

In the drawings in which I have shown a substantial embodiment of my invention, Figure 1, is a plan view of the apparatus in position to clean coke from an oven which is horizontally sectioned. Fig. 2 is a side elevation of the apparatus with portions of the oven wall cut away. Fig. 3 is a view in perspective of the rake guide and support. Fig. 4 is the side elevation of the rake handle. Fig. 5 is a plan view in detail of the rake and handle. Fig. 6 is a view in perspective of one of the rake blades.

The present invention consists of a platform A, upon which the other parts of my apparatus are mounted. The said platform is to be moved from oven to oven as desired and is placed in front of the door or opening of the oven. A power driven shaft 1 is journaled in bearings 2, below one end of said platform, and power is applied thereto over the belt 3, by any motive power, that shown being a motor B. A counter shaft 4 is mounted upon the opposite end of said platform, and is driven by the same motive power either direct from the motor or indirectly through the said shaft 1. A crank arm 5 is secured on the end of said counter shaft 4, and one end of the rake handle C is operatively connected therewith. The said rake handle C consists of the bar 6, within one end of which is carried the spring 7, that bears against the crank arm 5. The other end portion of said bar 6 is operatively carried in the handle support D, and has a longitudinal channel 8 cut in its upper face and a plurality of spaced apart holes 9 bored therethrough. An extension piece 10 is detachably fastened on the end of said bar 6, and one or more blades 40 are detachably secured thereon. The said piece 10 has holes 11 bored therein to receive the pin 12. The said pin 12 is carried in one end of the rod 13 and is to be inserted in the said holes 11 and 9 to fasten the extension piece 10 on the end of said bar 6. An additional fastener is provided on said handle to hold the piece 10 and bar 6 parallel consisting of a U-shaped clamp 14, which affords clearance for the said piece 10 to pivot, and the legs of which are fastened to the sides of the bar 6 while the body of the clamp passes over the upper side of said piece 10. A hand lever is provided on the end of said rod 13 by means of which said rod is partially rotated to insert or withdraw said pin 12, and said pin acts as the pivot pin when the free end of said piece 10 is to be shifted laterally to reach every portion of the interior of the coke ovens. The handle support D consists of a rectangular frame 15, the feet of which are pivoted to said platform A as shown at 16, to allow the top of said frame to be moved toward or from the oven. A cross head E is carried in said frame 15 by the pins 18 which are to operate in slots 19 cut in the upright portions of said frame. The said cross head E consists of two parallel spaced apart pieces 20 and 21 and the handle C is secured rigidly to said piece 20, the means shown being a threaded U-shaped clamp or bolt 17 which is passed around the said piece 20 with the legs passed through two of said holes 9, and nuts screwed thereon. The said piece 21 has longitudinal slots 22 cut in its sides, and another slot 23 cut through from its top to the bottom. A shifting block 24 is slidably carried on said piece 21 with lateral pins therein which engage in said slots 22, and a vertical pin 25 which depends therefrom through the said slot 23 and engages in a longitudinal slot in the upper face of said end piece 10. A flexible cable 26 has its ends fastened to opposite sides of said shifting block 24 and is passed over sheave pulleys secured within said slot 23 to the piece 21, then over other pulleys 27 and to and around a manually operated capstan 28 vertically mounted on said platform. A seat 29 is provided on which the operator may be seated, and from which he operates the said capstan and lever portion of the rod 13. A trough 30 is provided adjacent to the opening of the oven into which the coke is delivered by the rake blades 40, one or more of which are detachably fastened on said extension piece 10, and one of which blades deposits the coke in said trough 30. The said trough is inclined from said oven and deposits the coke on a conveyer belt G, that is made of sprocket chains for the sides and wire mesh screening 31 on said chains for the body of the belt. Slats or shallow buckets 32 are fastened on said belt to aid in carrying the coke up the incline of said conveyer. An adjustable apron 33 is fastened at the end of said conveyer belt to carry the coke into the car H. The said conveyer belt G is operated over sprocket wheels 34, which are secured on the end portion of said shaft 1, that imparts motion to said conveyer. The said rake blades 40 are detachably secured on said piece 10 by means of a pin portion 38 of said blades being passed through a hole in said end piece 10 and the blade held against said end piece by a strap hinge 35 which is secured on one part of said rake blade and passed over the top side of said end piece 10 and caught by a spring clamp on the other side of said blade. If desirable three or four of said blades may be used at once on said end piece 10. The operation of my apparatus is as follows:— With power applied through the belt 3, the shaft 1 is rotated, and when the operator wishes to withdraw coke from an oven, which is shown at K, he throws the clutch 45 that is carried on the shaft 4 into engagement with the drive wheel 36, whereby motion is imparted to said shaft 4. The rotary motion of said shaft 4 is changed and imparted as reciprocatory motion to the said handle C. The said handle C is operatively connected with said support D, which is moved from the dotted position shown in Fig. 2 to the vertical position, shown in full lines in Figs. 2 and 3, and when said support is in that position the crank end of the handle will be lowered and the blade carrying end will be elevated, as shown in dotted lines in Fig. 2, and as the rotation of said shaft 4 is continued the handle C with the rake blades thereon is pushed farther into the oven. The support D will move on its pivots 16, and will lower the free end of the handle C, and the blade 40 will engage the coke. When the handle is in this, called the extended position, a knocker member 41 which is secured on and rotates with a shaft 42 that is operatively connected by the belt 43 with the said shaft 1, will strike an extended lug 44 on said handle C and drive or move said handle longitudinally against the tension of said spring 7. When said knocker member 41 in rotating passes said lug 44, the spring 7 will throw said handle in the opposite longitudinal direction and until said handle has been moved by said crank arm 5 far enough to take said lug 44 out of the annular path of the knocker 41, the blade 40 will be moved back and forth which movements and the weight of the blade and free end of the handle will cause the blade to sink in the mass of coke, while at the same time the blade will be drawn across the oven by a longitudinal movement of the handle. The slots 19 in the frame 15 allow the blade 40 to drag horizontally while the other end of the handle C moves in the circle of the crank arm 5. Any number of blades 40 may be used on the handle C, holes being shown in Fig. 5 for four of them. By turning the capstan 28 the shifting block 24 may be moved to the right or left on the cross head E and the end of the handle piece 10 on which the blades 40 are carried will be shifted to the left or right as desired to move the blades to any part of the interior of the oven as shown in dotted lines in Fig. 1.

Having thus described my invention I desire to secure by Letters Patent and claim:

1. A coke oven rake consisting of a power driven shaft; a belt conveyer driven from said shaft; a crank shaft driven from said shaft; a handle moved longitudinally by said crank shaft; a support for the free end of said handle; an extension piece detachably pivoted to the end portion of said handle; coke engaging blades detachably fastened on said extension piece; means to turn the said extension piece on its pivot; a rotary knocking member driven by the first mentioned shaft to shift said handle longitudinally when said blades are engaged with coke.

2. A coke oven rake consisting of a power driven shaft; a belt conveyer driven from said shaft; a crank shaft driven from said shaft; a handle moved longitudinally by said crank shaft; a support for the free end of said handle; an extension piece detachably pivoted to the end portion of said handle; coke engaging blades detachably fastened on said extension piece; means to turn said extension piece on its pivot, said means consisting of a cross head carried in said support; a shifting block carried on said crosshead; a flexible cable having its ends fastened to said block; sheave pulleys over which said cable is carried to a capstan; a manually operated capstan to move said cable longitudinally; and a pin connecting said shifting block and said extension piece; and a rotary knocking member driven by the first mentioned shaft to shift said handle longitudinally when said blades are engaged with coke.

In testimony whereof I have affixed my signature.

BUNZO WATANABE.

Copies of this patent may be obtained for five cents each, by addressing the "Commissioner of Patents, Washington, D. C."